(12) United States Patent
Lee et al.

(10) Patent No.: US 7,088,400 B2
(45) Date of Patent: Aug. 8, 2006

(54) DISPLAY APPARATUS HAVING TV TUNER AND METHOD THEREOF

(75) Inventors: Kyung-kyun Lee, Seoul (KR); You-sub Lee, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 740 days.

(21) Appl. No.: 10/200,974

(22) Filed: Jul. 24, 2002

(65) Prior Publication Data

US 2003/0112380 A1  Jun. 19, 2003

(30) Foreign Application Priority Data

Dec. 17, 2001 (KR) ............... 2001-80128

(51) Int. Cl.
*H04N 5/64* (2006.01)
(52) U.S. Cl. .................................... 348/836
(58) Field of Classification Search ............... 348/836, 348/843, 731
See application file for complete search history.

(56) References Cited

U.S. PATENT DOCUMENTS

| | | | | |
|---|---|---|---|---|
| 3,168,561 | A * | 2/1965 | Richter | 560/312 |
| 4,157,504 | A * | 6/1979 | Ito et al. | 455/175.1 |
| 4,969,046 | A * | 11/1990 | Sugimoto et al. | 348/839 |
| 5,592,234 | A | 1/1997 | Gardner et al. | |
| 5,742,358 | A * | 4/1998 | Iijima et al. | 348/789 |
| 5,949,493 | A * | 9/1999 | Mudra et al. | 348/553 |
| 5,969,776 | A * | 10/1999 | Han | 348/836 |
| 6,130,727 | A | 10/2000 | Toyozumi | |
| 6,256,075 | B1 * | 7/2001 | Yang | 348/843 |
| 6,400,419 | B1 * | 6/2002 | Yamamoto | 348/731 |
| 6,693,680 | B1 * | 2/2004 | Cho et al. | 348/836 |

FOREIGN PATENT DOCUMENTS

| | | |
|---|---|---|
| JP | 60-52180 | 3/1985 |
| JP | 6-133245 | 5/1994 |
| JP | 6-149413 | 5/1994 |
| JP | 7-234744 | 9/1995 |
| JP | 8-5986 | 1/1996 |
| JP | 9-6250 | 1/1997 |
| JP | 9-166766 | 6/1997 |
| JP | 9-288526 | 11/1997 |
| JP | 11-127405 | 5/1999 |
| JP | 2000-332625 | 11/2000 |
| JP | 2001-78120 | 3/2001 |
| JP | 2001078120 A * | 3/2001 |
| KR | 61-179883 | 11/1986 |
| KR | 9-6250 | 1/1997 |
| KR | 1999-35553 | 5/1999 |
| KR | 2001-78120 | 3/2001 |

* cited by examiner

*Primary Examiner*—Paulos M. Natnael
(74) *Attorney, Agent, or Firm*—Staas & Halsey LLP (57) ABSTRACT

A display apparatus includes an LCD panel, a main PCB having a signal processor processing and transmitting a video signal to the LCD panel, and a PCB supporting member supporting the main PCB, a front cover, and a rear cover attached to the front cover to accommodate the PCB supporting member, the main PCB, and the LCD panel, a through hole formed in the rear cover. A TV tuner unit includes a TV tuner receiving a TV video signal, a casing accommodating the TV tuner, and a projection formed on the casing. A tuner accommodating part includes a housing in which the TV tuner unit is removably inserted, a projection holder locking and releasing the projection of the casing, a pushing part inserted into the through hole of the rear cover and releasing the projection from the projection holder. The TV tuner is easily combined into and removed from the display apparatus.

46 Claims, 10 Drawing Sheets

DISPLAY APPARATUS HAVING TV TUNER AND METHOD THEREOF

CROSS-REFERENCE TO RELATED APPLICATIONS

This application claims the benefit of Korean Application No. 2001-80128, filed Dec. 17, 2001, in the Korean Industrial Property Office, the disclosure of which is incorporated herein by reference.

BACKGROUND OF THE INVENTION

1. Field of the Invention

The present invention relates in general to a display apparatus having a TV tuner and method thereof, and more particularly, a display apparatus having a TV tuner easily combined into and removed from the display apparatus without disassembling the display apparatus.

2. Description of the Related Art

A display apparatus, such as a monitor for a TV set or a computer system, includes a cathode ray tube (CRT) monitor, a liquid crystal display (LCD) monitor, etc.

The CRT monitor employs a principle that when various electron beams according to video signals strikes a monochrome or red, green, blue (RGB) fluorescent material painted on a CRT panel, light having different brightness and various colors is generated. The CRT monitor is widely used because of an economical price and a good display quality thereof, but it occupies a large space because of the bulky size thereof.

The LCD monitor employs another principle that when a predetermined voltage is supplied to a LCD panel, a molecular arrangement thereof varies in response to the voltage to prevent light from passing therethrough. The LCD monitor is thin in thickness, but is expensive in price and relatively poor in display quality in comparison with the CRT monitor.

Figure 1:
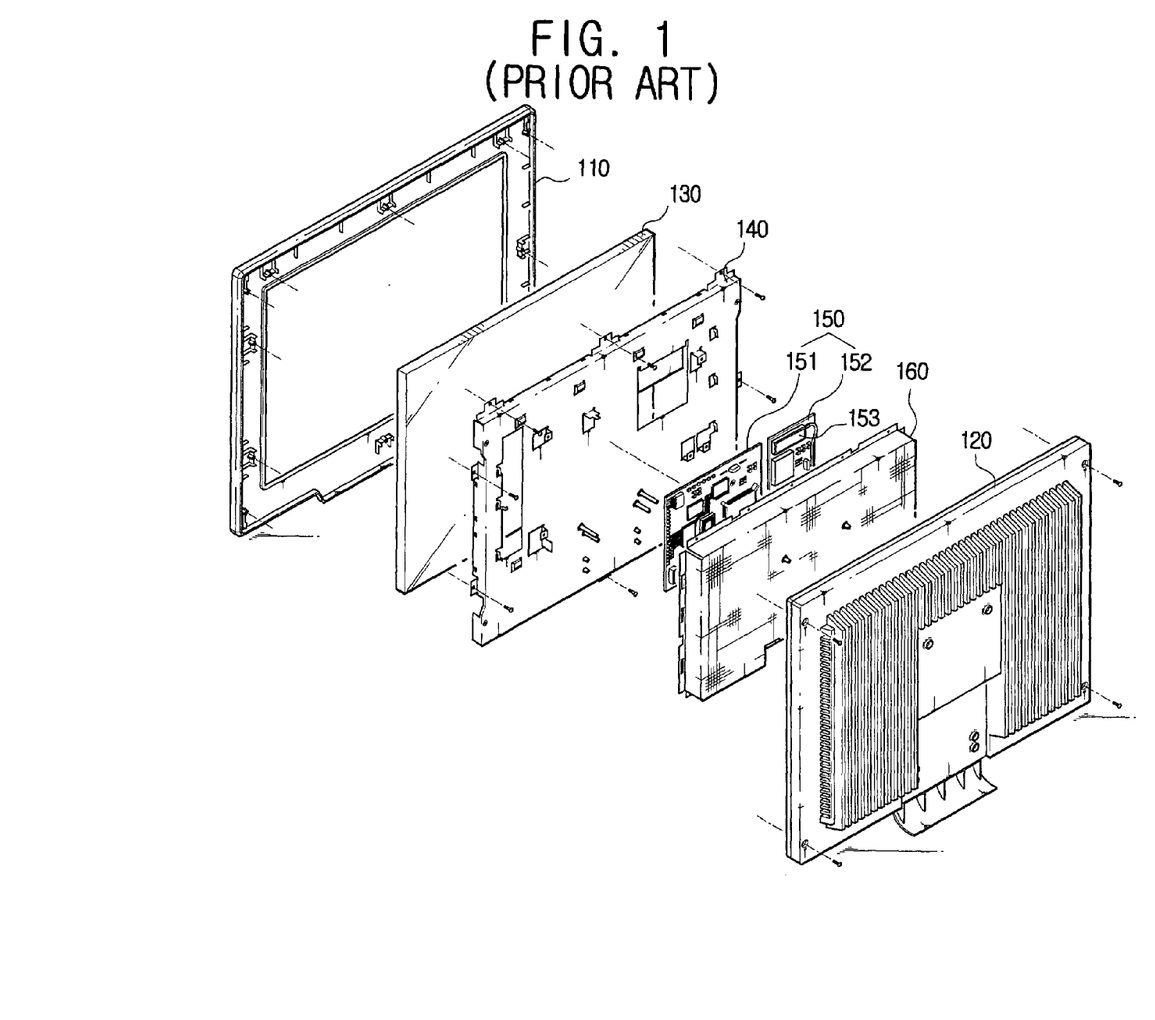
FIG. 1 is a rear exploded perspective view of a conventional display apparatus.

Referring to FIG. 1, a conventional display apparatus includes front and rear covers 110 and 120 coupled to each other to provide a predetermined accommodating space therebetween, an LCD panel 130 having an effective surface on which a picture is displayed, a panel supporting member 140 supporting the LCD panel 130, and a printed circuit board (PCB) assembly 150 supported by a PCB cover 160 and transmitting electric signals to the LCD panel 130.

The PCB assembly 150 includes a main PCB 151 outputting a video signal to the LCD panel 130, and a TV tuner PCB 152 accommodating a TV tuner 153 electrically connected to the main PCB 151 and receiving a TV video signal.

The main PCB 151 receives the video signal from a personal computer (not shown) and outputs the electric signals to the LCD panel 130 through a signal processor which has an analog/digital (A/D) converter and a scaler. Further, the main PCB 151 receives the TV video signal from the TV tuner 153 and outputs the electric signals to the LCD panel 130 through the signal processor.

The TV tuner 153 coupled to the main PCB 151 and the TV tuner PCB 152 receives the TV video signal without a separate device such as a personal computer, and outputs the TV video signal to the LCD panel 130 through the main PCB 151. Thus, the TV tuner PCB 152 should be equipped with not only the TV tuner 153 but also a video decoder (not shown). The video decoder converts an analog video signal received through the TV tuner 153 into a digital video signal and transmits the digital video signal to the signal processor of the main PCB 151. Then, the signal processor of the main PCB 151 outputs the digital video signal including horizontal/vertical signals or YUV digital signals received from the TV tuner PCB 152, to the LCD panel 130 through a control part and the scaler. Consequently, the conventional display apparatus can output the TV video signal without a separate device attached to the conventional display apparatus.

However, in the conventional display apparatus, since the TV tuner 153 and the TV tuner PCB 152 are integrally installed in the PCB assembly 150 inside the PCB cover 160, the TV tuner 153 is not optionally provided to a user.

Thus, it is more effective to develop a display apparatus and a TV tuner easily combined into and removed from the display apparatus if necessary.

SUMMARY OF THE INVENTION

Accordingly, the present invention has been made to overcome the above and other problems, and an object of the present invention is to provide a display apparatus and a TV tuner easily combined into and removed from the display apparatus without disassembling the display apparatus.

Additional objects and advantages of the invention will be set forth in part in the description which follows and, in part, will be obvious from the description, or may be learned by practice of the invention.

These and other objects of the present invention may be achieved by providing a display apparatus including a liquid crystal display (LCD) panel, a main printed circuit board (PCB) having a signal processor processing and transmitting a video signal to the LCD panel, a PCB supporting member supporting the main PCB, a front cover, a rear cover attached to the front cover to accommodate the LCD panel, the main PCB, and the PCB supporting member, the rear cover having a through hole, a TV tuner unit including a TV tuner receiving a TV video signal, a casing accommodating the TV tuner and having a projection, and a tuner accommodating part including a housing receiving the TV tuner unit, a projection holder locking and releasing the projection of the casing of the TV tuner unit, and a pushing part inserted into the through hole of the rear cover to control the projection holder to lock onto the projection of the TV tuner unit when the TV tuner unit is inserted into the tuner accommodating part and to release the projection from the projection holder when the TV tuner unit is removed from the tuner accommodating part.

The tuner unit accommodating part is removably combined with at least one of the rear cover and the PCB supporting member and includes at least one hook. One of the rear cover and the PCB supporting member is provided with at least one hook holder coupled to the hook.

The projection holder is incorporated with the pushing part. The display apparatus includes an elastic member having a first end being in contact with the housing of the tuner unit accommodating part and a second end being in contact with the pushing part, and the pushing part is biased in a direction opposite to a pushing direction to couple the projection to the projection holder.

Further, the TV tuner unit includes an earth terminal exposed to an outside of the casing, and at least one of the rear cover and the PCB supporting member is provided an earth spring being in contact with the earth terminal of the TV tuner unit. Further, the TV tuner unit is provided with an earth terminal through hole through which the earth terminal is exposed, and the tuner unit accommodating part is provided with an earth spring through hole communicating with the earth terminal through hole to allow the earth spring to be inserted into the earth spring through hole and the earth terminal through hole and to be in contact with the earth terminal of the TV turner unit.

The tuner unit accommodating part and the TV tuner unit are provided with guiding parts, respectively, to guide the TV tuner unit within the tuner accommodating part.

BRIEF DESCRIPTION OF THE DRAWINGS

These and other objects and advantages of the present invention will become apparent and more readily appreciated from the following description of the embodiments, taken in conjunction with the accompany drawings of which.

DETAILED DESCRIPTION OF THE PREFERRED EMBODIMENT

Reference will now be made in detail to the present preferred embodiments of the present invention, examples of which are illustrated in the accompanying drawings, wherein like reference numerals refer to the like elements throughout. The embodiments are described below in order to explain the present invention by referring to the figures.

Figure 2:
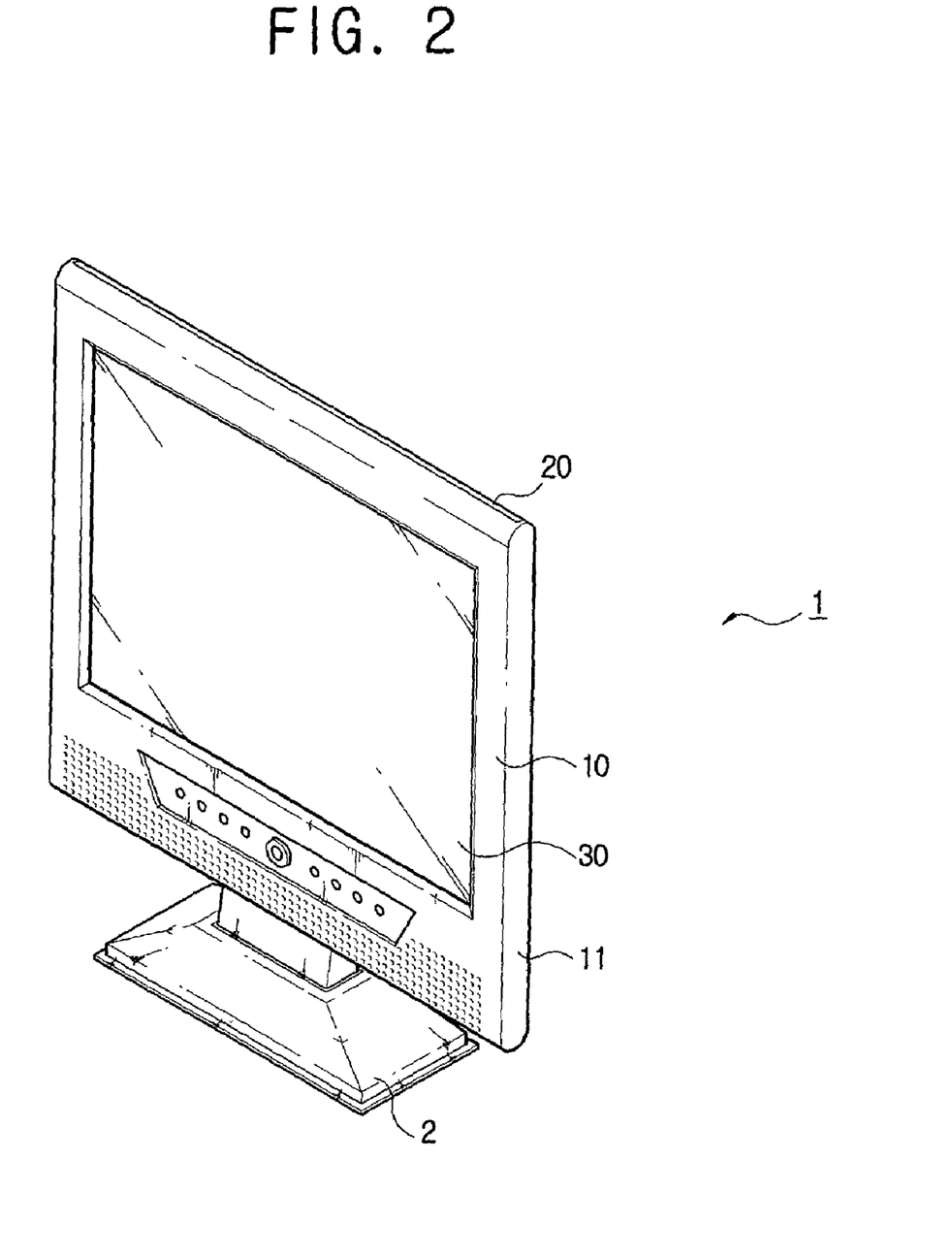
FIG. 2 is a front perspective view of a display apparatus according to an embodiment of the present invention.

A display apparatus 1 used in a computer, a TV set, etc., is, as shown in FIG. 2, supported by a support 2 and installed on a decoration table, a desk, etc. A front cover 10 is coupled to a rear cover 20, and a liquid crystal display (LCD) panel 30 is shown through a front part 11 of the front cover 10.

Figure 3:
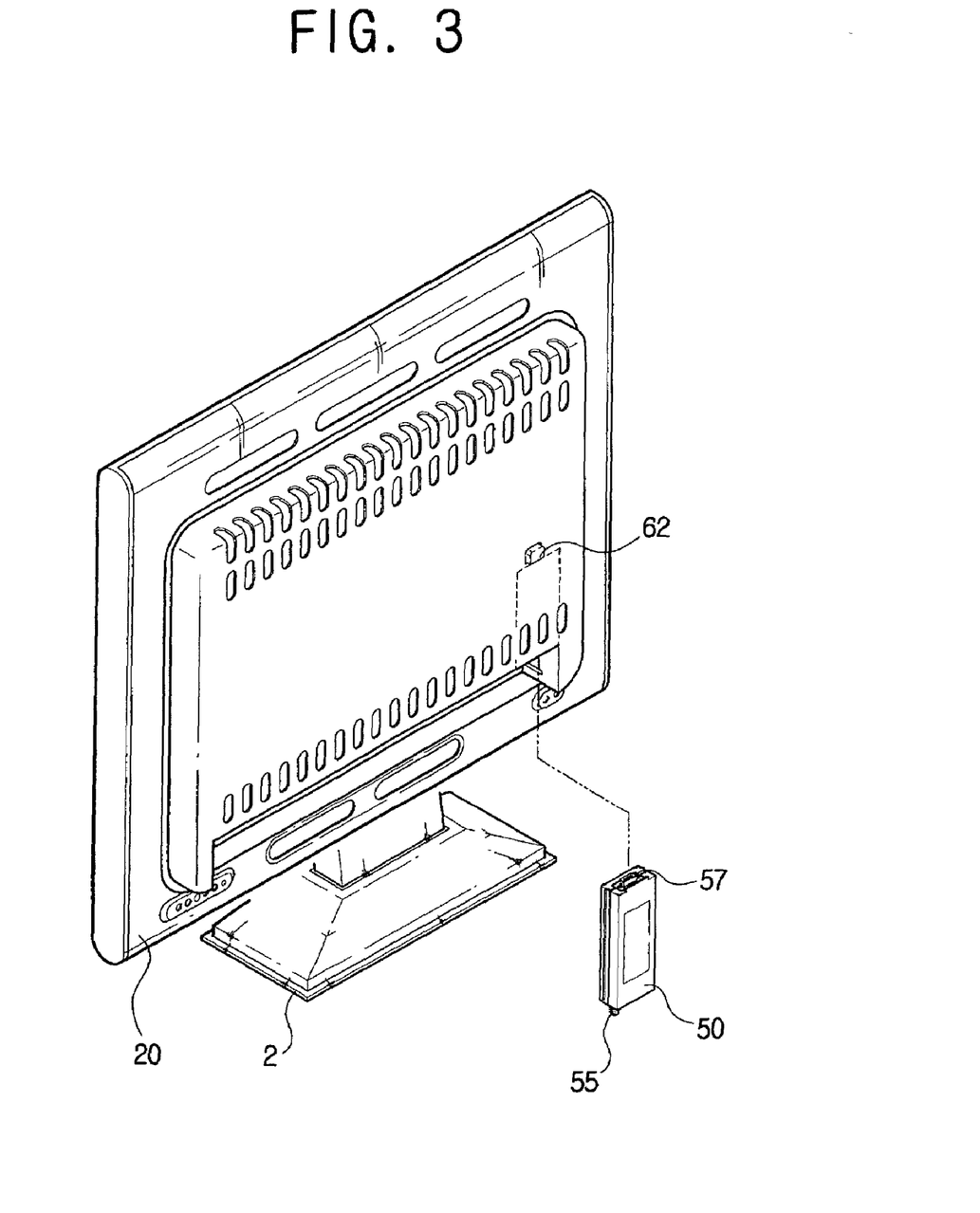
FIG. 3 is a rear perspective view of the display apparatus of FIG. 2.
Figure 4:
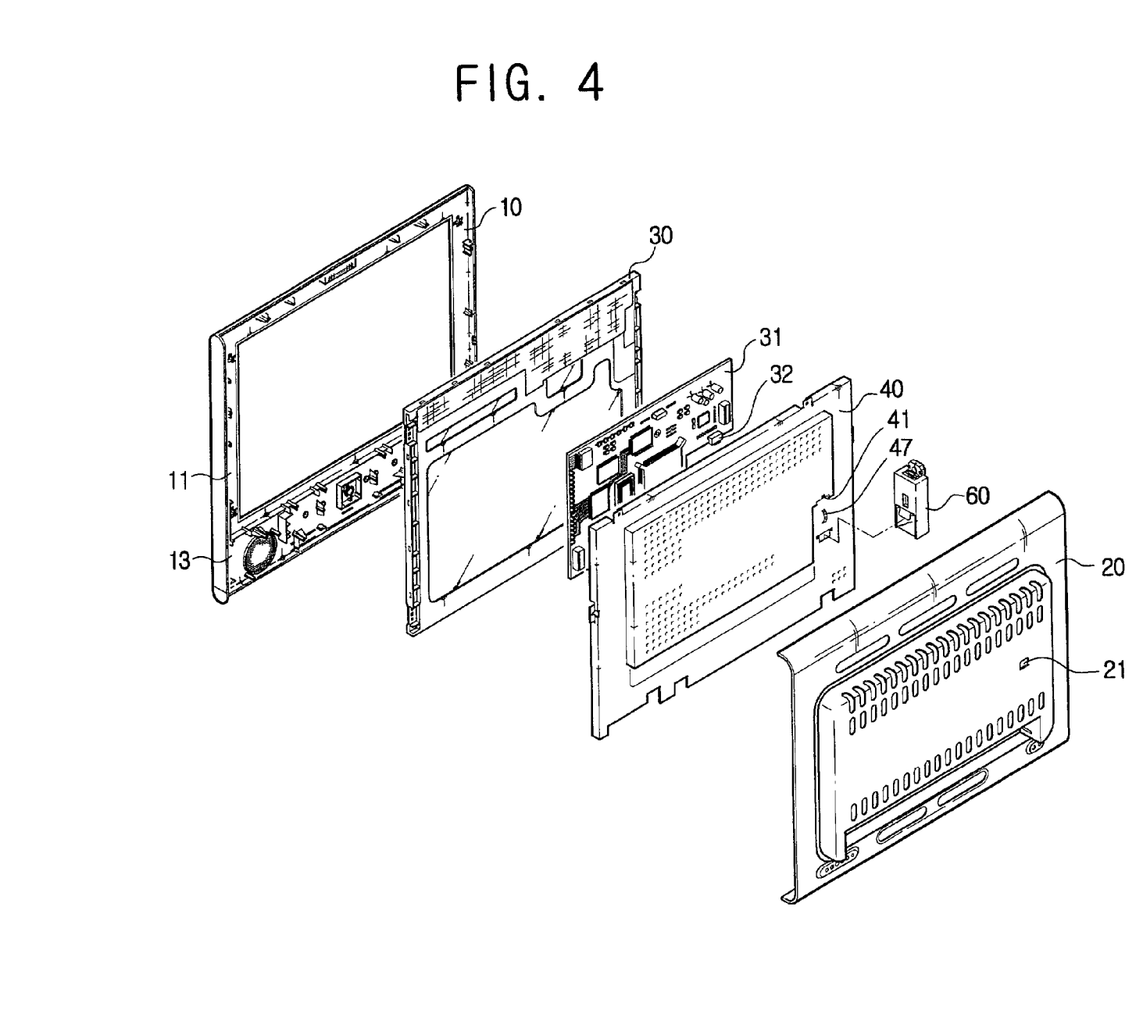
FIG. 4 is a rear exploded perspective view of the display apparatus of FIG. 2.

The display apparatus 1, as illustrated in FIGS. 3 and 4, includes the front and rear covers 10 and 20 being coupled to each other to form a predetermined accommodating space therebetween, the LCD panel 30 having an effective surface on which a picture is displayed, a printed circuit board (PCB) supporting member 40 having a main PCB 31 and a connection port 32 and combined with the LCD panel 30 to support the LCD panel 30, and a TV tuner unit 50 removably provided at the rear cover 20 and receiving a TV video signal, transmitting the TV video signal to the main PCB 31 through the connection port 32, and outputting the TV video signal to the LCD panel 30. Herein, "the effective surface" denotes a front surface of the LCD panel 30 exposed to an outside of the display apparatus 1 through the front cover 10 to display a picture.

The front cover 10 includes the front part 11 having an opening through which the effective surface of the LCD panel 30 is exposed to the outside of the display apparatus 1, and a skirt part 13 bent toward the rear cover 20 at all sides of the front part 11. Further, at a rear side of the front cover 10 are, as shown in FIG. 4, provided the LCD panel 30 and the main PCB 31 disposed at a rear portion of the LCD panel 30 opposite to the effective surface.

A pushing part 62 is inserted into an inside of the rear cover 20 through a pushing part through hole 21 to hold and release the TV tuner unit 50. A connector 57 of the TV tuner unit 50 is connected to the connection port 32 of the main PCB 31 protruding from the PCB supporting member 40 through a port opening 41. An antenna jack 55 of the TV tuner unit 50 is coupled to an external TV signal source. An earth spring (ground) 47 is formed on the PCB supporting member 40 and is connected to the TV tuner unit 50 when the TV tuner unit 50 is inserted into a tuner unit accommodating part 60.

Figure 5:
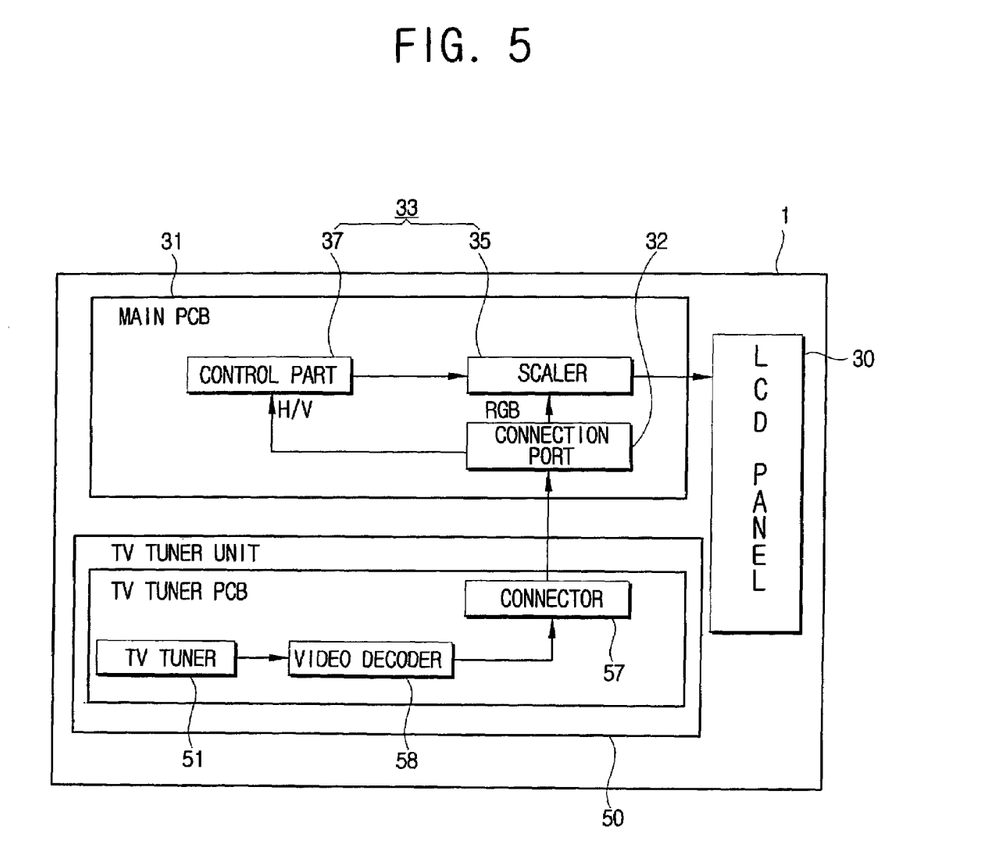
FIG. 5 is a block diagram of the display apparatus of FIG. 2.

Referring to FIG. 5, the main PCB 31 includes the connection port 32 through which a video signal generated from the TV tuner unit 50 in response to the TV video signal is inputted to the main PCB 31, a signal processing part 33 having a control part 37 and a scaler 35 converting the video signal inputted through the connection port 32 to be fit for a size of the LCD panel 30. The TV tuner unit 50 includes a TV tuner 51, a decoder 58, and a connector 57 coupled to the connection port 32.

Figure 6:
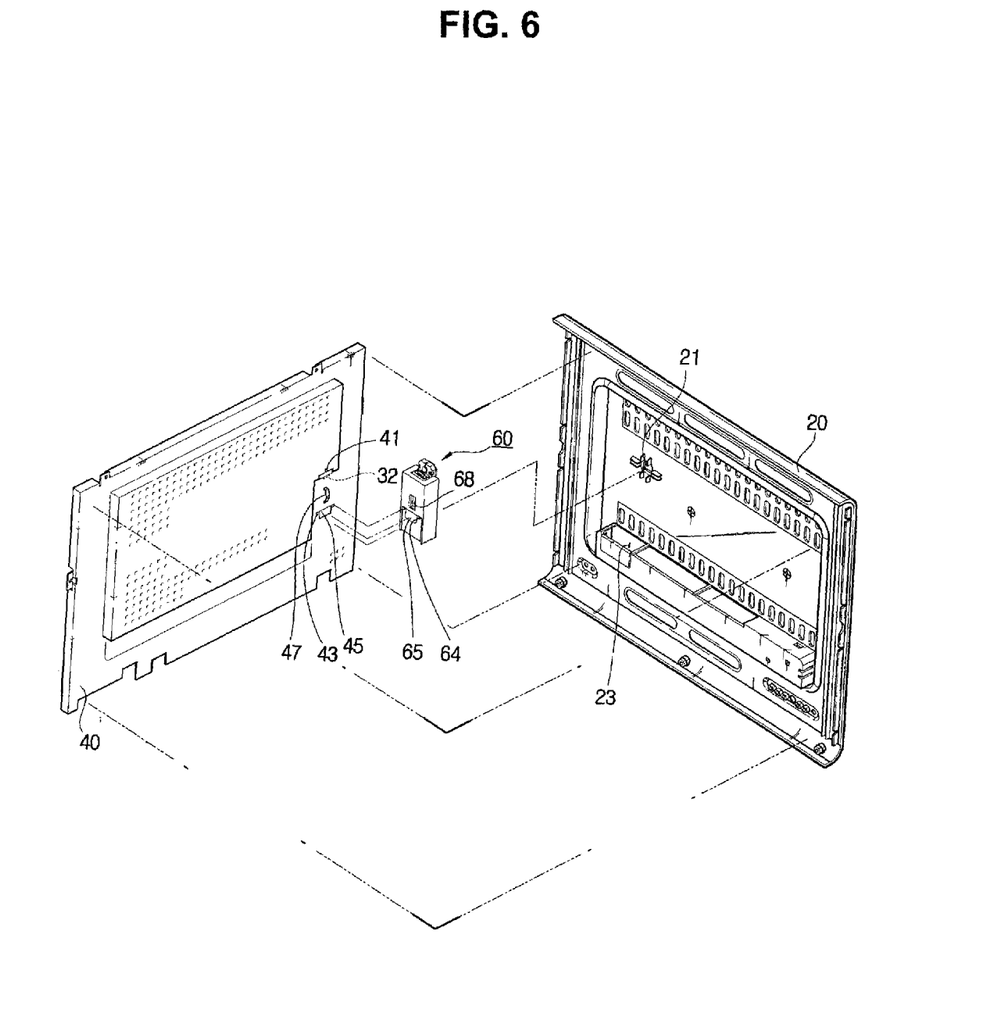
FIG. 6 illustrates the combination of a PCB supporting member and a rear cover in the display apparatus of FIG. 2.

The connection port 32 is, as shown in FIGS. 4 and 6, formed on a portion of the main PCB 31 and exposed to an outside of the PCB supporting member 40 through the port opening 41. Herein, a position of the connection port 32 of the main PCB 31 of FIG. 4 corresponds to a connector opening 67 of the tuner unit accommodating part 60 of FIG. 8. Thus, the connection port 32 mates with the connector 57 exposed to an outside of the TV tuner unit 50 through the connector opening 67 of FIG. 8 when the TV tuner unit 50 is inserted in the tuner unit accommodating part 60, thereby transmitting the video signal received from the TV tuner unit 50 to the main PCB 31.

From the video signal inputted through the connection port 32, red, green and blue (RGB) signals are transmitted to the scaler 35, and horizontal and vertical synchronous signals are transmitted to the control part 37. Then, the control part 37 recognizes a resolution of the LCD panel 30 depending upon the horizontal and vertical synchronous signals and outputs a control signal according to the resolution to the scaler 35. Then, the scaler 35 adjusts the RGB signals received through the connection port 32 to be fit for the size of the LCD panel on the basis of the control signal generated from the control part 37, thereby displaying an image corresponding to the adjusted RGB signals on the LCD panel 30.

The PCB supporting member 40 is of a plate shape having a housing space for accommodating the main PCB 31 and covers a rear portion of the main PCB 31 as shown in FIGS. 4 and 6. Further, the PCB supporting member 40 is made of a shield material, such as metal, to cut off noxious electromagnetic waves generated from the main PCB 31 and the LCD panel 30.

Figure 7:
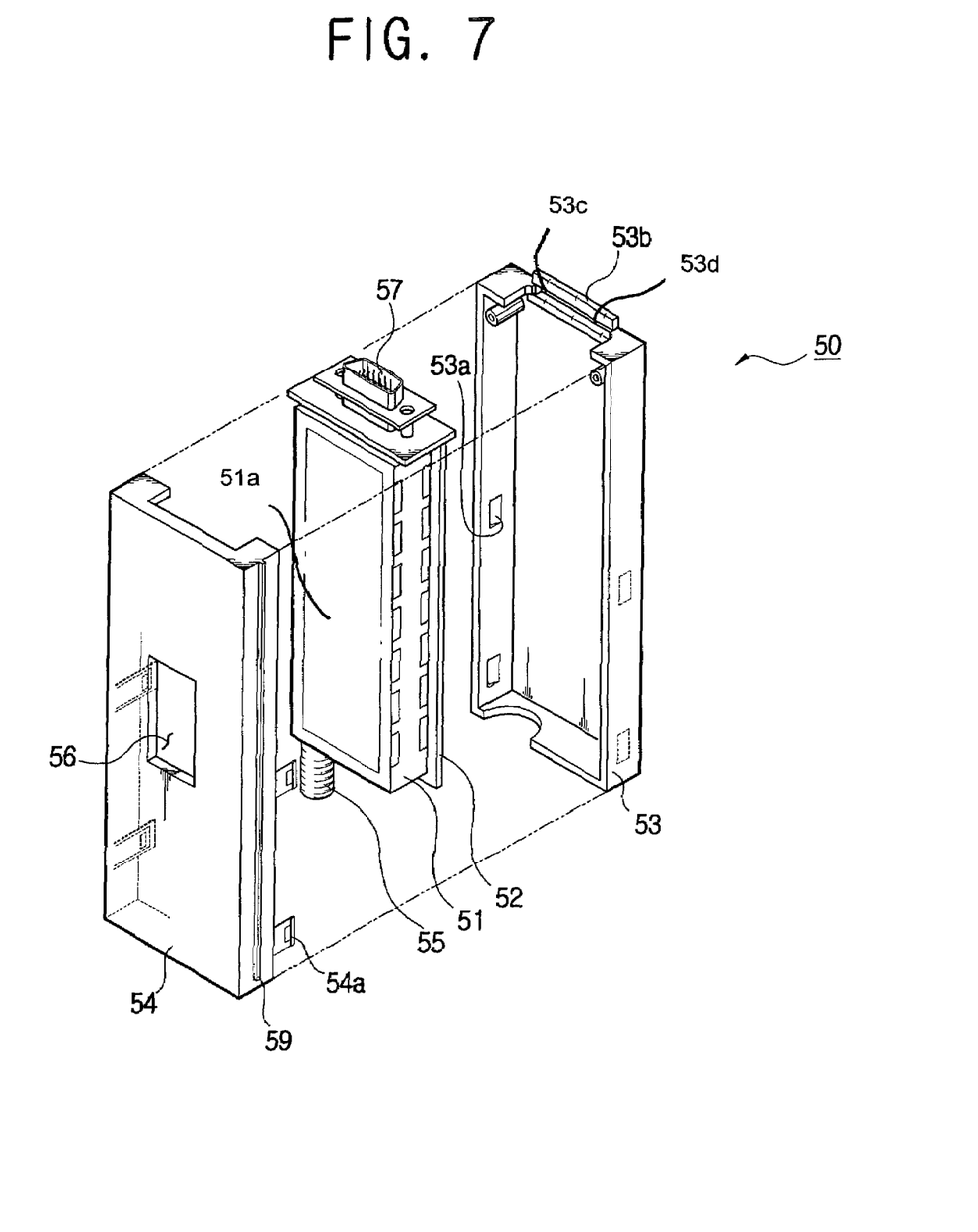
FIG. 7 is an exploded perspective view of a TV tuner unit of the display apparatus of FIG. 2.

In the PCB supporting member 40 is provided the port opening 41 through which the connection port 32 of the main PCB 31 is exposed to a rear side of the PCB supporting member 40. First and second hook holders 43 and 45 are formed on the PCB supporting member 40 below the port opening 41 to correspond to a first hook 64 and a second hook 65 as shown in FIGS. 4 and 6, and the earth spring 47 is disposed between the opening 41 and the first and second hook holders 43 and 45 to be in contact with an earth part 51a of the TV tuner 51 of the TV tuner unit 50 as shown in FIGS. 4, 6, and 7.

Figure 9:
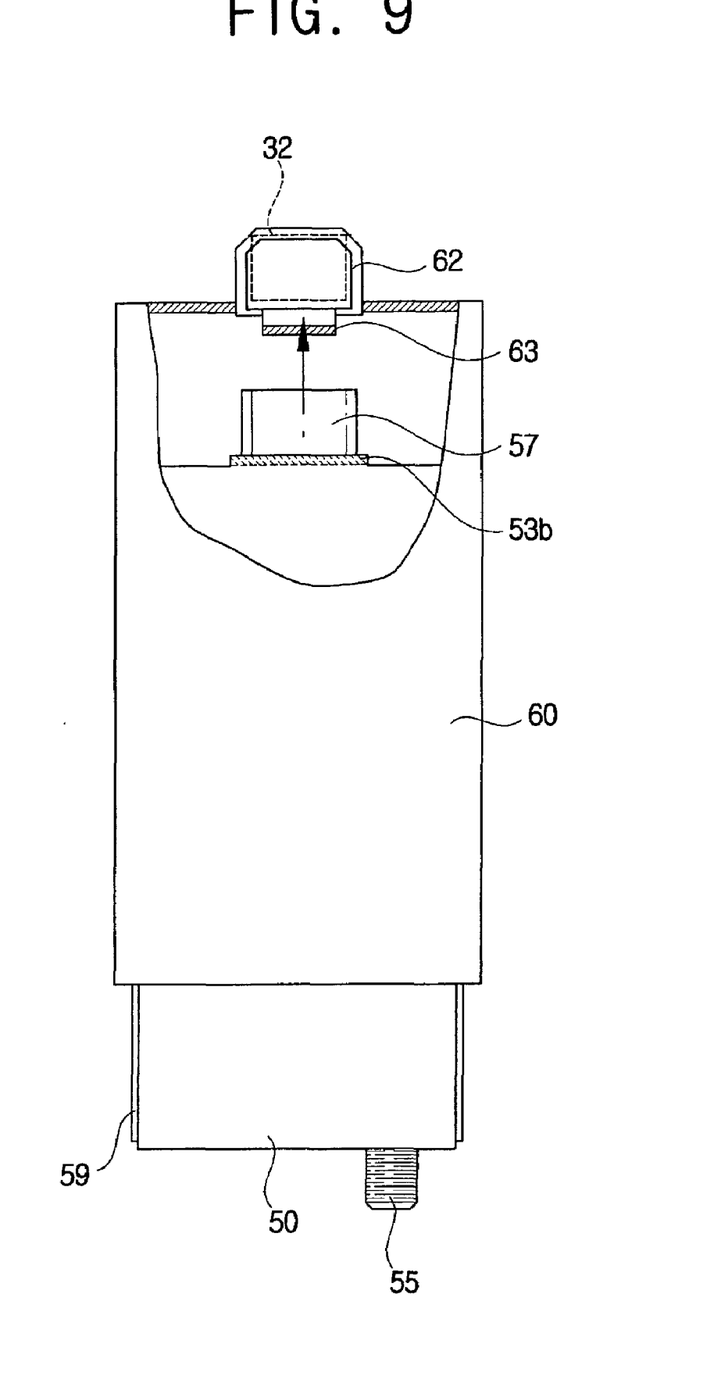
FIGS. 9 and 10 illustrate an assembling state such that a connector of the TV tuner unit of the tuner unit accommodating part is coupled to a connection part of a main PCB when the tuner unit accommodating part is inserted into the display apparatus of FIG. 2.

The port opening 41 is formed such that the connection port 32 of the main PCB 31 is exposed to the outside of the PCB supporting member 40 therethrough and mates with the connector 57 of the TV tuner unit 50. Thus, the connection port 32 exposed to the outside of the PCB supporting member 40 through the port opening 41 mates with the connector 57 for data communication as shown in FIGS. 7 and 9.

The first and second hook holders 43 and 45 are, as shown in FIG. 6, formed to be hooked onto and released from the first and second hooks 64 and 65 of the tuner unit accommodating part 60, thereby combining the tuner unit accommodating part 60 with the PCB supporting member 40 and removing the tuner unit accommodating part 60 from the PCB supporting member 40.

The rear cover 20 is combined with the front cover 10 and accommodates the LCD panel 30, the main PCB 31 having the connection port 32, and the PCB supporting member 40. In the rear cover 20 is provided the pushing part through hole 21 through which the pushing part 62 of the tuner unit accommodating part 60 is exposed to the outside of the rear cover 20. A tuner unit opening 23 is formed on the rear cover 20 to allow the TV tuner unit 50 to be inserted into the tuner accommodating part 60.

Thus, the TV tuner unit 50 is inserted into the tuner unit accommodating part 60 through the tuner unit opening 23 along the inside of the rear cover 20, and only a knob 62a of the pushing part 62 is exposed from an outer surface of the rear cover 20. As a result, an outer appearance of the display apparatus 1 becomes neat and simple as shown in FIG. 3.

Referring to FIG. 7, the TV tuner unit 50 includes the TV tuner 51 receiving the TV video signal, a TV tuner PCB 52 mounted with the TV tuner 51, upper and lower casings 53 and 54 combined together to accommodate the TV tuner 51 and the TV tuner PCB 52, a projection 53b provided on the upper casing 53, the connector 57 exposed from the combined upper and lower casings 53 and 54, and an antenna jack 55 connected to an external antenna (not shown).

The TV tuner 51 can receive the TV video signal and output the video signal to the LCD panel 30 without an additional device, such as a computer. Herein, there is further provided the video decoder 58 disposed in the TV tuner PCB 52 so that the TV video signal received by the TV tuner 51 is converted into a digital signal including H/V signals and YUV digital signals by the video decoder 58 and transmitted to the signal processing part 33 of the main PCB 31 through the connector 57 as the video signal.

At respective edges of the upper and lower casings 53 and 54 are provided a plurality of hook holders 53a and hooks 54a to couple the upper and lower casings 53 and 54.

Figure 8:
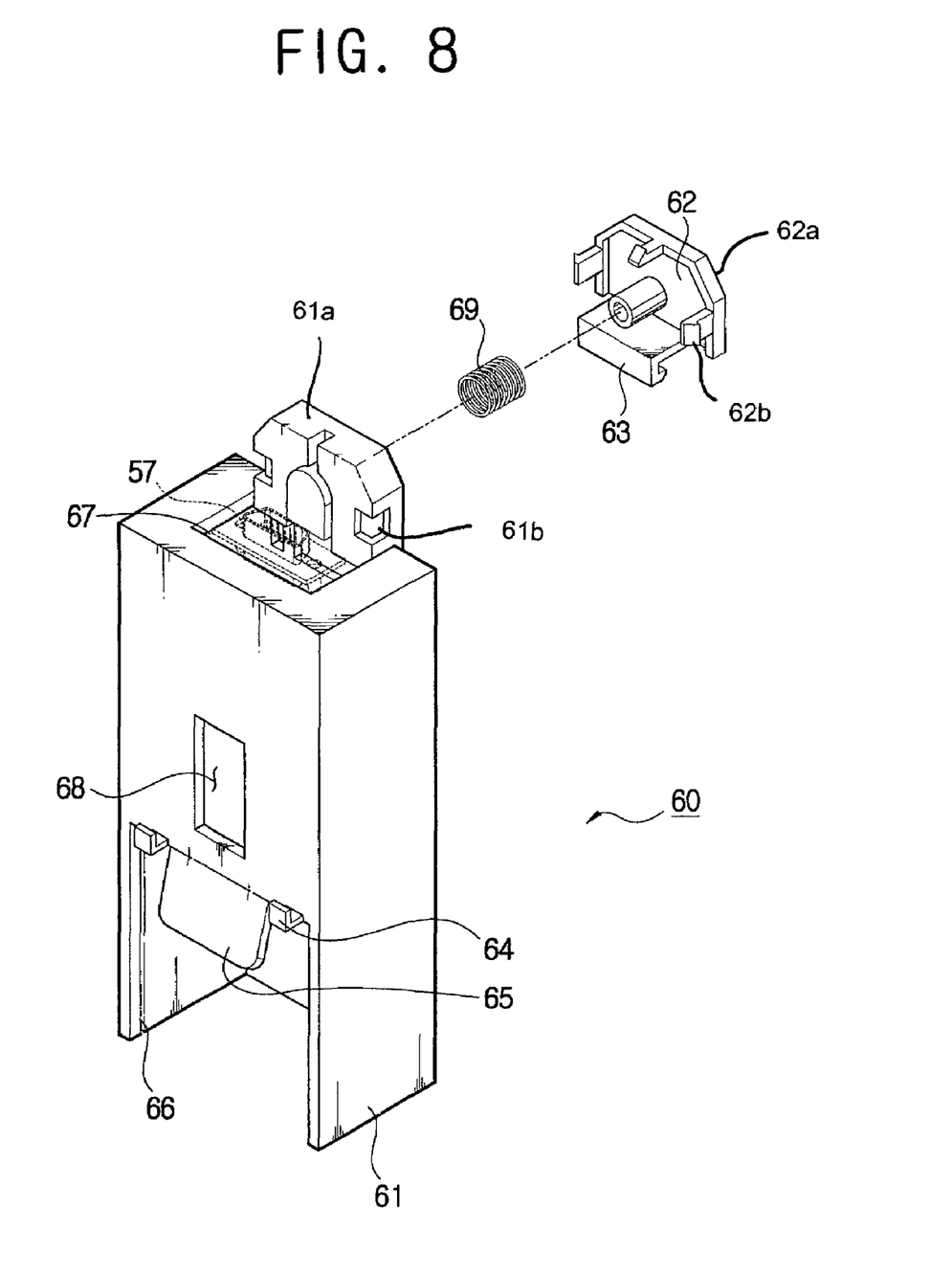
FIG. 8 is an exploded perspective view of a tuner unit accommodating part of the display apparatus of FIG. 2.

At an upper portion of the upper casing 53 is provided the projection 53b having an inclined portion 53c and a groove 53d, and a projection holder 63 of the tuner unit accommodating part 60 of FIG. 8 is slid along the inclined portion 53c and is inserted into the groove 53d of the TV tuner unit 50 to hold the TV tuner unit 50 in the tuner unit accommodating part 60 when the TV tuner unit 50 is inserted into the tuner unit accommodating port 60 in a state that the push part 62 is coupled to a coupling element 61a of FIG. 8. The projection holder 63 of the tuner unit accommodating port 60 is released from the groove 53d and slid along the inclined portion 53c when the pushing port 62 is pushed against the coupling element 61a of the housing 61 of the tuner unit accommodating part 60.

On the lower casing 54 is provided an earth part through hole 56 through which the earth part 51a of the TV tuner 51 is in contact with the earth spring 47 of the PCB supporting member 40, and at opposite sides of the lower casing 54 are provided guiding projections 59 preventing the TV tuner unit 50 from being inserted into the tuner unit accommodating part 60 in a wrong direction.

The antenna jack 55 is extended from the TV tuner 51 and protrudes from a lower part of the combined upper and lower casings 53 and 54, thereby being connected with the external antenna.

Further, the connector 57 is provided in the TV tuner PCB 52. As shown in FIG. 7, the connector 57 is extended from the TV tuner PCB 52 and protrudes from an upper part of the combined upper and lower casing 53 and 54, thereby being connected with the connection port 32 protruding from the PCB supporting member 40 through the port opening 41. Therefore, the digital signal converted by the video decoder 58 is transmitted to the signal processing part 33 of the main PCB 31 through the connection port 32. Then, the signal processing part 33 of the main PCB 31 transmits the digital signal to the LCD panel 30, thereby displaying the image corresponding to the TV video signal on the display apparatus 1.

Referring to FIG. 8, the TV tuner accommodating part 60 includes a housing 61 accommodating the TV tuner unit 50, the pushing part 62 inserted into the pushing part through hole 21 and having the knob 62a exposed from the rear cover 20, the projection holder 63 extended from the pushing part 62 to hold the projection 53b of the TV tuner unit 50 disposed in the housing 61, and the first and second hooks 64 and 65 provided on the housing 61 and hooked in and released from the first and second hook holders 43 and 45 of the PCB supporting member 40. The pushing unit 62 is coupled to the coupling element 61a when a coupler 62b is movably inserted into a coupler holder 61b of the coupling element 61a.

The housing 61 is made of plastic and has a box shape bigger than the TV tuner unit 50 so as to accommodate the TV tuner unit 50 therein. Further, in the housing 61 are provided guiding rails 66 engaged with the guiding projections 59 of the TV tuner unit 50. The connector opening 67 allows the connector 57 of the TV tuner unit 50 to be exposed from the tuner unit accommodating part 60, and the earth spring through hole 68 allows the earth spring 47 to be in contact with the earth part 51a of the TV tuner unit 50.

The guiding rails 66 include grooves formed at opposite inner walls of the housing 61 and are engaged with the guiding projections 59 of the TV tuner unit 50, thereby preventing the TV tuner unit 50 from being inserted in the tuner unit accommodating part 60 in the wrong direction.

The connector opening 67 is provided on the upper part of the housing 61 and the connector 57 of the TV tuner unit 50 disposed in the housing 61 passes therethrough. Thus, the connector 57 passes through the connector opening 67 and mates with the connection port 32 protruding toward the inside of the rear cover 20 so that the digital signal is transmitted to the main PCB 31.

The earth spring through hole 68 is provided on the housing 61 and communicates with the earth part through hole 56 of the TV tuner unit 50. Thus, the earth spring 47 is inserted into the earth spring through hole 68 and the earth part through hole 56 and is in contact with the earth part of the TV tuner 51, thereby directing noxious electromagnetic waves generated from the TV tuner unit 50 into the PCB supporting member 40.

The pushing part 62 is extended from the projection holder 63 and inserted into the through hole 21 of the rear cover 20 (as shown in FIGS. 3–7), and the projection holder 63 is locked to and released from the projection 53b of the TV tuner unit 50 disposed in the housing 61. Thus, the projection holder 63 locked to the projection 53b is released from the projection 53b by pushing the pushing part 62 incorporated with the projection holder 63, and the TV tuner unit 50 is removed from the tuner unit accommodating part 60. Herein, when the pushing part 62 is not pushed, the pushing part 62 is biased to an original position by an elastic member 69 disposed between the pushing part 62 and the housing 61.

The first hook 64 is upwardly bent from the housing 61 and hooked on the first hook holder 43 of the PCB supporting member 40. The second hook 65 is downwardly protruding at a predetermined angle and hooked on the second hook holder 45 of the PCB supporting member 40. Therefore, the second hook 65 is firstly hooked on the second hook holder 45, and then the first hook 64 is hooked onto the first hook holder 43, thereby combining the tuner unit accommodating part 60 with the PCB supporting member 40 as shown in FIGS. 6 and 8.

With this configuration, an assembling process of the display apparatus according to the embodiment the present invention will be described hereinafter.

First, the PCB supporting member 40 assembled with the main PCB 31 is arranged at the rear portion of the LCD panel 30, the effective surface of the LCD panel 30 is disposed toward the front cover 10, and then the front cover 10 and the PCB supporting member 40 are coupled each other to assemble the LCD panel 30 to the front cover 10. Then, the first and second hooks 64 and 65 of the tuner unit accommodating part 60 are hooked onto the first and second hook holders 43 and 45 of the PCB supporting member 40. Then, the rear side of the PCB supporting member 40 accommodating the tuner unit accommodating part 60 is covered with the rear cover 20, and subsequently the rear cover 20 and the front cover 10 are assembled.

Then, the pushing part 62 of the tuner unit accommodating part 60 of FIG. 8 is inserted into the pushing part through hole 21 of the rear cover 20 of FIGS. 4 and 6, and the earth spring 47 of the PCB supporting member 40 is partially inserted into the earth spring through hole 68 of the tuner unit accommodating part 60.

Then, the TV tuner unit 50 is inserted into the tuner unit accommodating part 60 through the tuner unit opening 23 of the rear cover 20. At this time, the TV tuner unit 50 is slid into the tuner unit accommodating part 60 because the guiding projections 59 guide the guiding rails 66 (as shown in FIGS. 8 and 9).

Figure 10:
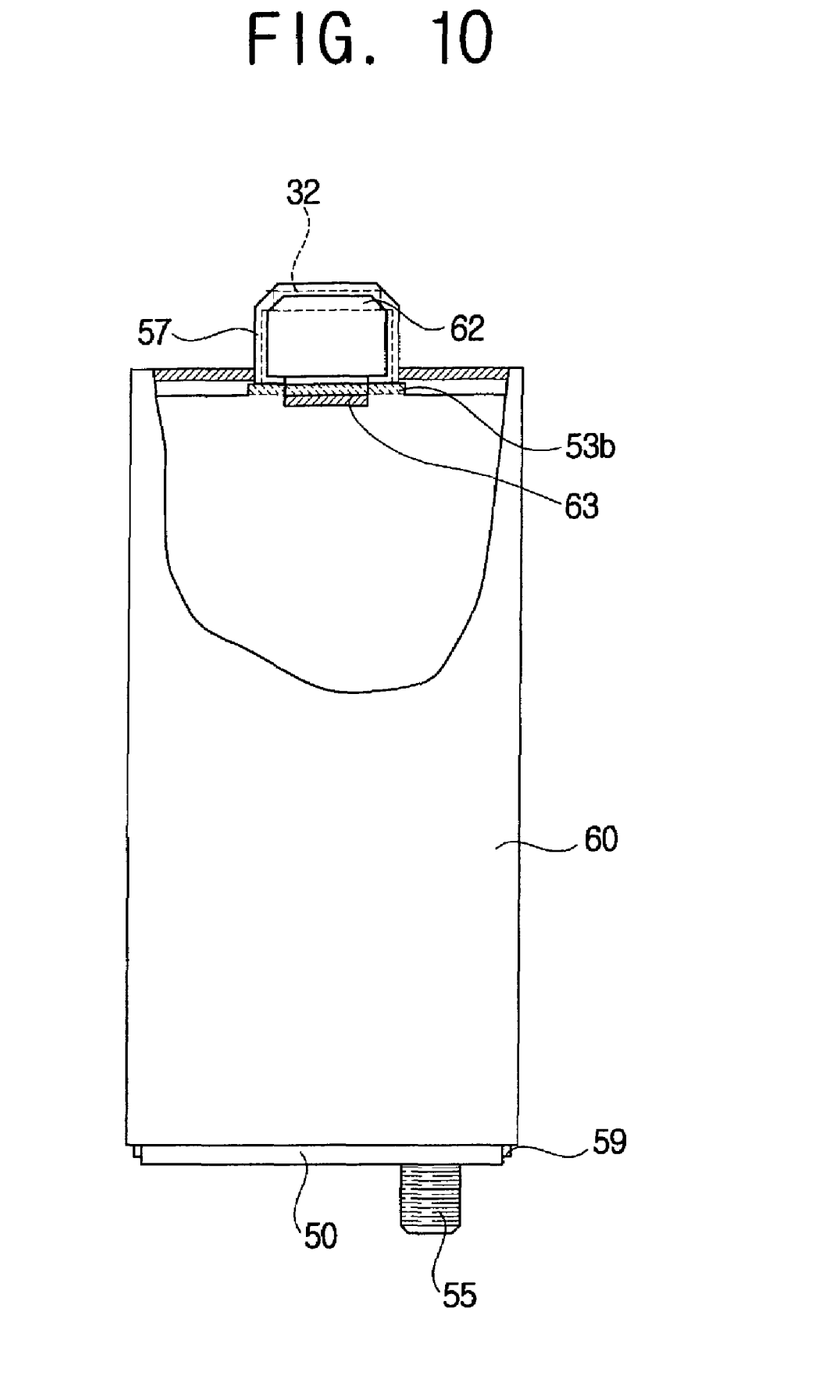

Herein, the projection 53b of the TV tuner unit 50 protrudes from the upper casing 53 and is locked onto the projection holder 63 extended from the pushing part 62 and disposed inside the housing part 61, thereby combining the TV tuner unit 50 with the tuner unit accommodating part 60. Further, the connector 57 of the TV tuner unit 50 is exposed from the housing 61 through the connector opening 67 of the housing 61 of FIG. 8, and mates with the connection port 32 provided on the main PCB 31 as shown in FIG. 10. Further, the earth spring 47 of the PCB supporting member 40 is inserted into the earth spring through hole 68 and the earth part through hole 56 and is in contact with the earth part 51a of the TV tuner 51 to cut off the noxious electromagnetic waves generated from the TV tuner unit 50.

On the other hand, the process of removing the TV tuner unit 50 from the display apparatus 1, in more detail, from the tuner unit accommodating part 60 is performed in an inverse order to the assembling process. Thus, the TV tuner 51 is easily combined into and removed from the display apparatus 1 using the tuner unit accommodating part 60 provided in the rear cover 20, and the TV tuner unit 50 is removably inserted into the tuner unit accommodating part 60. Therefore, the display apparatus and the TV tuner unit are separately or optionally provided and sold, and a user can buy the TV tuner unit to optionally attach the TV tuner unit to the display apparatus or replace an old TV tuner unit.

In the above configuration, as an example for coupling the tuner unit accommodating part 60 to the PCB supporting member 40 disposed inside the rear cover 20, the tuner unit accommodating part 60 is provided with the first and second hooks 64 and 65, and the PCB supporting member 40 is provided with the first and second hook holders 43 and 45. However, various coupling member, such as a screw and a screw hole, etc., may be used for the coupling process.

As described above, the present invention provides a display apparatus and a TV tuner easily combined into and removed from the display apparatus without disassembling the display apparatus.

Although a few embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A display apparatus comprising an LCD panel, a main printed circuit board PCB having a signal processor processing and transmitting a video signal to the LCD panel, and a PCB supporting member supporting the main PCB, the display apparatus comprising:
   a front cover;
   a rear cover coupled to the front cover to accommodate the LCD panel, main PCB, and the PCB supporting member, and having a pushing part through hole;
   a TV tuner unit including a TV tuner receiving a TV video signal, a casing accommodating the TV tuner, and a projection formed on the casing; and
   a tuner accommodating part disposed between the rear cover and the PCB supporting member, including a housing into which the TV tuner unit is removably inserted, a projection holder locked onto or released from the projection of the casing, a pushing part exposed from the rear cover and inserted through the pushing part through hole of the rear cover to control the projection holder to be locked onto and released from the projection of the TV tuner unit.

2. The display apparatus according to claim 1, wherein the tuner accommodating part is removably coupled to one of the rear cover and the PCB supporting member.

3. The display apparatus according to claim 2, wherein the tuner accommodating part is provided with at least one hook, and the one of the rear cover and the PCB supporting member is provided with at least one hook holder coupled to the hook.

4. The display apparatus according to claim 1, wherein the projection holder is incorporated with the pushing part.

5. The display apparatus according to claim 1, wherein the tuner accommodating part comprises an elastic member having a first end being in contact with the housing and a second end being in contact with the pushing part, wherein the pushing part is biased in a direction opposite to a pushing direction pushing the pushing part against the projection of the casing.

6. The display apparatus according to claim 1, wherein the TV tuner unit comprises an earth terminal exposed from the casing, and one of the rear cover and the PCB supporting member is provided with an earth spring being in contact with the earth terminal of the TV tuner unit when the TV tuner unit is inserted into the tuner accommodating part.

7. The display apparatus according to claim 6, wherein the earth spring has one end being in contact with the PCB supporting member.

8. The display apparatus according to claim 6, wherein the TV tuner unit is provided with an earth part through hole through which the earth terminal is exposed, and the tuner accommodating part is provided with an earth spring through hole communicating with the earth part through hole to allow the earth spring to be in contact with the earth terminal.

9. The display apparatus according to claim 1, wherein the TV tuner unit comprises a TV tuner PCB having a decoder converting the TV video signal received from the TV tuner into a digital signal and transmitting the digital signal to the signal processor of the main PCB, and the signal processor generates the video signal in response to the digital signal.

10. The display apparatus according to claim 1, wherein the tuner accommodating part and the TV tuner unit are provided with respective guiding portions guiding the TV tuner unit upon insertion into the tuner accommodating part.

11. The display apparatus according to claim 10, wherein the guiding portions comprise:
   guiding projections provided on opposite sides of the TV tuner unit; and
   guiding rails provided on opposite inner walls of the tuner accommodating part, wherein the guiding projections respectively receive the guiding rails upon insertion of the TV tuner unit into the TV accommodating unit.

12. A display apparatus, comprising:
   a display panel;
   a main printed circuit board (PCB) having a signal processor transmitting a video signal to the display panel and a connection port connected to the signal processor;
   a PCB supporting member supporting the main PCB and having a port opening receiving the connection port
   a front cover;
   a rear cover attached to the front cover to accommodate the display panel, the main PCB, and a PCB supporting member, the rear cover having a tuner unit opening;
   a tuner accommodating part disposed between the PCB supporting member and the rear cover to be coupled to the PCB supporting member, having a housing, a connector opening formed on the housing corresponding to the port opening of the PCB supporting member, and a tuner receiving opening formed on the housing corresponding to the tuner unit opening of the rear cover; and
   a TV tuner unit inserted from an outside of the rear cover into the tuner accommodating part through the tuner unit opening of the rear cover and the tuner receiving opening of the tuner accommodating part in an inserting direction, having a casing with an upper opening corresponding to the port opening of the PCB supporting and the connector opening of the tuner accommodating part, a TV tuner contained in the casing, and a connector formed on the TV tuner to protrude from the casing through the upper opening and coupled to the connection port of the main PCB through the connector opening of the tuner accommodating part and the port opening of the PCB supporting member.

13. The display apparatus of claim 12, wherein the TV tuner unit is detached from the tuner accommodating part through the tuner unit opening of the rear cover and the tuner receiving opening of the tuner accommodating part in a detaching direction opposite to the inserting direction without dissembling of the rear cover from the front cover.

14. The display apparatus of claim 12, wherein the tuner unit opening of the rear cover, the tuner receiving opening of the tuner accommodating part, the connector opening of the tuner accommodating part, and the connection port of the main PCB are arranged in line parallel to the inserting direction.

15. The display apparatus of claim 12, wherein the connection port of the main PCB protrudes from the main PCB towards the port opening and the connector opening in the inserting direction.

16. The display apparatus of claim 12, wherein the connector of the TV tuner projects from the casing towards the connection port in the inserting direction.

17. The display apparatus of claim 12, wherein the rear cover comprises a pushing part through hole, and the tuner accommodating part comprises a pushing part inserted into the pushing part through hole of the rear cover from the outside of the rear cover to be coupled to the casing of the TV tuner unit.

18. The display apparatus of claim 17, wherein the tuner accommodating part comprises a coupling element formed on the housing to be coupled to the pushing part.

19. The display apparatus of claim 18, wherein the tuner accommodating part comprises an elastic member having a first end being in contact with the coupling element of the housing and a second end being in contact with the pushing part, and the elastic member biasing the pushing part toward the outside of the rear cover.

20. The display apparatus of claim 17, wherein the TV tuner unit comprises a projection formed on the casing, and the pushing part comprises a projection holder coupled to the projection of the TV tuner unit when the TV tuner unit is inserted into the tuner accommodating part and when the connector of the TV tuner unit is coupled to the connection port of the main PCB.

21. The display apparatus of claim 20, wherein the projection comprises a groove and an inclined portion disposed adjacent to the groove to guide the projection holder to be smoothly inserted into and released from the groove.

22. The display apparatus of claim 12, wherein the tuner accommodating part comprises a guiding rail formed along an inside surface of the housing in the inserting direction, and the TV tuner unit comprises a guiding projection parallel to the guiding rail of the tuner accommodating part and is guided by the guiding rail and the guiding projection when the TV tuner unit is inserted into the tuner accommodating part.

23. The display apparatus of claim 12, wherein the PCB supporting member comprises an earth spring, the tuner accommodating part comprises an earth spring through hole formed on the housing to correspond to the earth spring of the PCB supporting member, and the TV tuner unit comprises an earth part formed on the TV tuner corresponding to the earth spring through hole of the tuner accommodating part, the earth spring of the PCB supporting member connected to the earth part of the TV tuner unit through the earth spring through hole of the tuner accommodating part.

24. The display apparatus of claim 23, wherein the TV tuner unit comprises an earth part through hole formed on the casing corresponding to the earth spring through hole of the tuner accommodating part, the earth spring connected to the earth part of the TV tuner through the earth part through hole.

25. The display apparatus of claim 24, wherein the earth spring projects from the PCB supporting member in a direction perpendicular to the inserting direction.

26. The display apparatus of claim 24, wherein the earth spring is coupled to the earth part of the TV tuner to direct an electromagnetic wave generated from the TV tuner unit into the PCB supporting member.

27. The display apparatus of claim 12, wherein the TV tuner unit comprises an antenna jack formed on the TV tuner and disposed at the tuner receiving opening of the tuner accommodating part and the tuner unit opening of the rear cover when the TV tuner unit is inserted into the tuner accommodating part.

28. The display apparatus of claim 27, wherein the antenna jack is formed on the TV tuner opposite to the connector in the inserting direction.

29. The display apparatus of claim 12, wherein the antenna jack projects from the rear cover through the tuner unit opening of the rear cover in a direction parallel to the inserting direction.

30. The display apparatus of claim 12, wherein the tuner accommodating part comprises at least one hook, and one of the rear cover and the PCB supporting member comprises at least one hook holder coupled to the corresponding hook of the tuner accommodating part.

31. The display apparatus of claim 12, wherein the PCB supporting member is made of a shield material to cut off an electromagnetic wave generated from the main PCB and the display panel.

32. The display apparatus of claim 12, wherein the casing of the TV tuner unit comprises an upper case, a lower case, a hook holder formed on the upper case, and a hook formed on the lower case coupled to the hook holder of the upper case.

33. The display apparatus of claim 12, wherein the housing of the tuner accommodating part is made of plastic and has a box shape to accommodate the TV tuner unit.

34. The display apparatus of claim 12, wherein the tuner accommodating part comprises a first hook upwardly bent from the housing and a second hook downwardly protruding at a predetermined angle from the housing, and the PCB supporting member comprises a first hook holder and a second hook holder coupled to the first hook and the second hook, respectively, to couple the tuner accommodating part to the PCB supporting member.

35. A display apparatus receiving a TV tuner unit, comprising:
a display panel;
a main printed circuit board (PCB) having a signal processor transmitting a video signal to the display panel and a connection port connected to the signal processor;
a PCB supporting member supporting the main PCB, and having a port opening receiving the connection port and an earth spring protruding toward the rear cover;
a front cover;
a rear cover attached to the front cover to accommodate the display panel, the main PCB, and a PCB supporting member, the rear cover having a tuner unit opening; and
a tuner accommodating part disposed between the PCB supporting member and the rear cover and coupled to the PCB supporting member, having a housing, a connector opening formed on a first side of the housing corresponding to the port opening of the PCB supporting member to receive the connection port, an earth spring through hole formed on a second side of the housing corresponding to the earth spring, and a tuner receiving opening formed on a third side of the housing to receive the TV tuner unit inserted into the housing from an outside of the rear cover through the tuner unit opening of the rear cover in an inserting direction, the connection port of the main PCB and the earth spring of the PCB supporting member both coupled to the TV tuner unit.

36. The display apparatus of claim 35, wherein the TV tuner unit comprises a casing, a tuner PCB contained in the casing, a TV tuner contained in the casing and coupled to the tuner PCB to receive a TV signal, an earth part formed on the tuner PCB to be coupled to the earth spring of the PCB supporting member through the earth spring through hole of the housing, a connector formed on the tuner PCB and coupled to the connection port of the main PCB through the connector opening of the tuner accommodating part and the port opening of the PCB supporting member, and a decoder disposed in the tuner PCB to convert the TV signal to the video signal.

37. The display apparatus of claim 36, wherein the TV tuner unit comprises an upper opening formed on the casing corresponding to the port opening of the PCB supporting member and the connector opening of the tuner accommodating part, an earth part through hole formed on the casing corresponding to the earth spring through hole of the turner accommodating part, and the connector coupled to the connection port of the main PCB through the upper opening, the earth part coupled to the earth spring through the earth part through hole.

38. The display apparatus of claim 36, wherein the TV tuner unit comprises an antenna jack formed on the TV tuner opposite to the connector and disposed adjacent to the tuner unit opening of the rear cover to receive the TV signal from an external source when the TV tuner unit is inserted into the tuner accommodating part.

39. The display apparatus of claim 36, wherein the second side of the housing is parallel to the inserting direction, and the first and third sides of the housing are perpendicular to the inserting direction.

40. The display apparatus of claim 36, wherein the tuner accommodating part comprises a pushing part inserted from the outside of the rear cover into an inside of the rear cover to couple the TV tuner unit to the housing of the tuner accommodating part.

41. A TV tuner unit for a display apparatus, comprising:
a casing having a first surface and a second surface;
a tuner PCB contained in the casing;
a TV tuner contained in the casing and coupled to the tuner PCB to receive a TV signal;
an earth part formed on the tuner PCB;
an earth part through hole formed on the first surface of the casing corresponding to the earth part of the TV tuner;
a connector opening formed on the second surface of the casing;
a connector formed on the tuner PCB to protrude from the casing through the connector opening; and
a decoder disposed in the tuner PCB and coupled between the TV tuner and the connector to convert the TV signal into a video signal and transmit the video signal to an outside of the TV tuner unit through the connector.

42. The TV tuner unit of claim 41, wherein the first and second surfaces of the casing are not disposed on the same plane of the casing.

43. The TV tuner unit of claim 41, wherein the TV tuner comprises an antenna jack protruding from the casing to receive the TV signal.

44. The TV tuner unit of claim 43, wherein the casing comprises a third surface and an antenna opening formed on the third surface corresponding to the antenna jack, and the antenna jack protrudes the casing through the antenna opening.

45. The TV tuner unit of claim 44, wherein the third surface is disposed opposite to the second surface with respect to the first surface.

46. A method in a display apparatus, comprising:
coupling a main printed circuit board (PCB) having a processor and a connection port to a PCB supporting member having an earth spring and a port opening receiving the connection port of the main PCB;
coupling the PCB supporting member to a display panel and a front cover;
coupling a tuner accommodating part having an earth spring through hole, a connector opening, and a tuner receiving opening to the PCB supporting member;
coupling a rear cover having a tuner unit opening and a pushing part through hole to the front cover to accommodate the display panel, the main PCB, the PCB supporting member between the front cover and the rear cover, the tuner accommodating part disposed between the rear cover and the PCB supporting member;
inserting a pushing unit from an outside of the rear cover through the pushing part through hole to be movably coupled to the tuner accommodating part;
inserting a TV tuner unit having a TV tuner, an earth part, and a connector into the turner accommodating part through the tuner unit opening of the rear cover and the tuner receiving opening of the tuner accommodating part;
connecting the connector of the TV tuner unit to the connection port of the main PCB through the port opening of the PCB supporting member and the connector opening of the turner accommodating part;
connecting the earth spring of the PCB supporting member to the earth part of the TV tuner unit through the earth spring through hole of the tuner accommodating part; and
connecting the pushing part to the TV tuner unit.

* * * * *

UNITED STATES PATENT AND TRADEMARK OFFICE
CERTIFICATE OF CORRECTION

PATENT NO. : 7,088,400 B2 Page 1 of 1
APPLICATION NO. : 10/200974
DATED : August 8, 2006
INVENTOR(S) : Kyung-kyun Lee et al.

It is certified that error appears in the above-identified patent and that said Letters Patent is hereby corrected as shown below:

Col. 8, line 35, change "printed circuit board" to --(printed circuit board)--

Col. 12, line 33, change "turner" to --tuner--

Col. 14, line 12, change "turner" to --tuner--

Col. 14, line 19, change "turner" to --tuner--

Signed and Sealed this

Sixteenth Day of January, 2007

JON W. DUDAS
*Director of the United States Patent and Trademark Office*